May 23, 1950   W. C. HUNGERFORD   2,508,390
MILLING MACHINE ATTACHMENT
Filed Sept. 11, 1945   2 Sheets-Sheet 1
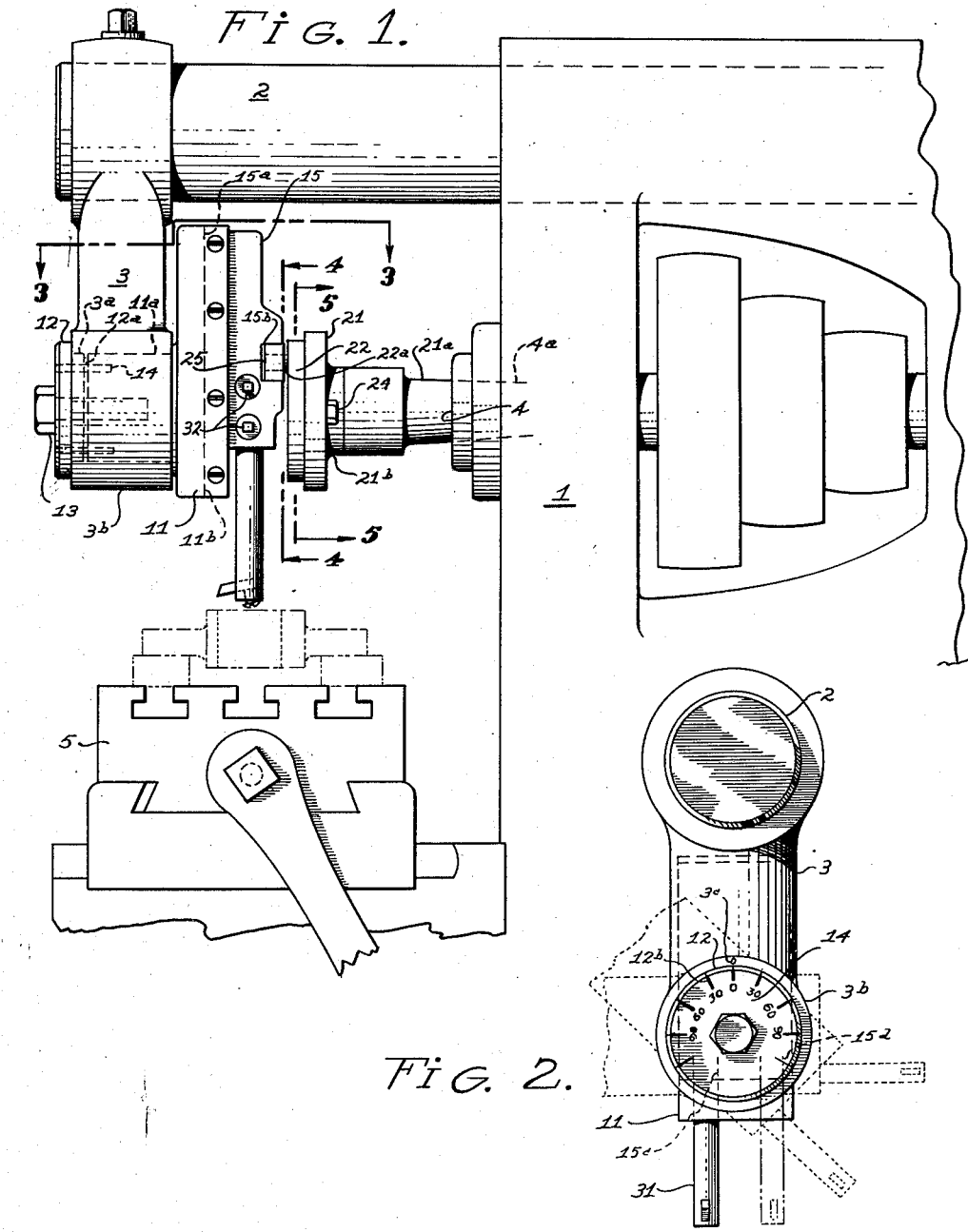
Fig. 1.
Fig. 2.
INVENTOR.
WILLARD C. HUNGERFORD
BY
ATTORNEY May 23, 1950     W. C. HUNGERFORD     2,508,390
MILLING MACHINE ATTACHMENT
Filed Sept. 11, 1945     2 Sheets-Sheet 2
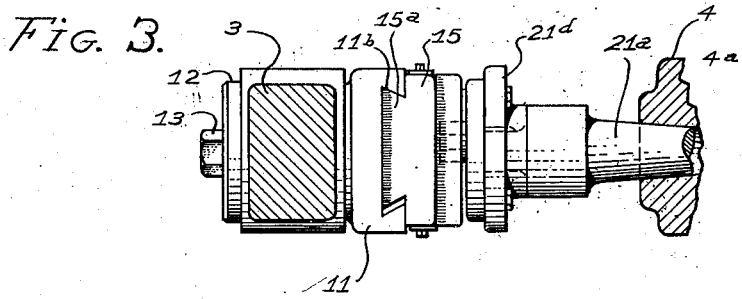
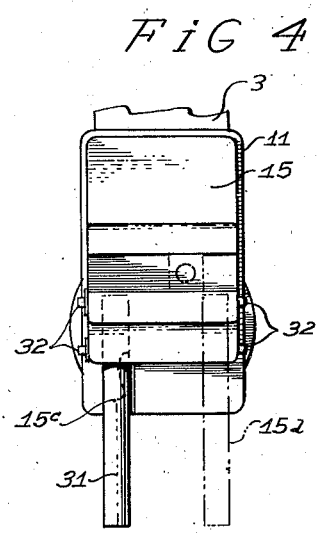
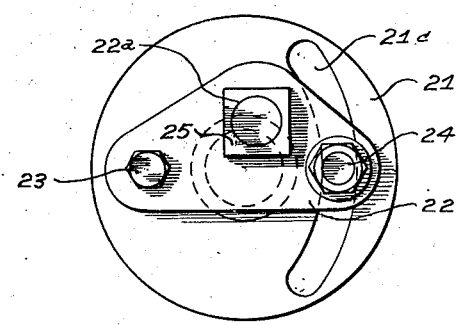
INVENTOR.
WILLARD C. HUNGERFORD
BY
ATTORNEY Patented May 23, 1950

2,508,390

UNITED STATES PATENT OFFICE 2,508,390

MILLING MACHINE ATTACHMENT

Willard C. Hungerford, Inglewood, Calif.

Application September 11, 1945, Serial No. 615,664

7 Claims. (Cl. 90—44)

My invention relates to milling machines, and more particularly to a slotting attachment for such machines.

One of the principal objects of this invention is to provide a simple slotting device and one which may be economically made and incorporated in a milling machine.

Another important object of this invention is to provide a device of this class which may be easily and quickly shifted to any desired angle for making slots or carrying on other cutting operations in different directions.

An important object also of this invention is to provide a novel and simple slotting attachment for milling machines.

Still another important object of this invention is to provide means or a device of this class whereby a cutter bar may be supported in one of several locations when the device is secured in various adjusted angular positions.

A further important object of this invention is to provide simple and novel means for operatively connecting the device to the milling machine drive spindle for reciprocating the slotter.

A still further important object of this invention is to provide novel means of adjusting the crank for varying the throw thereof and the consequent reciprocating stroke of the cutter.

With these and other objects in view, as will appear hereinafter, I have devised a slotting means or slotting attachment for milling machines, as will be hereinafter described in detail and particularly set forth in the appended claims, reference being had to the accompanying drawings and to the characters of reference thereon, which form a part of this application, in which:

Fig. 1 is a fragmentary side elevational view of a milling machine embodying my invention in a preferred form;

Fig. 2 is a fragmentary front elevational view thereof;

Fig. 3 is a sectional view thereof in plan taken through 3—3 of Fig. 1;

Fig. 4 is a fragmentary sectional elevational view thereof, taken through 4—4 of Fig. 1, showing the back side of the cutter head; and, Fig. 5 is another fragmentary sectional elevational view thereof, showing the crank means for operating the slotting mechanism.

The milling machine, shown in the drawings, is of standard or conventional construction, consisting essentially of a frame 1, an overarm 2, a bracket 3 depending from the end of the arm, a spindle 4, and a work supporting carriage 5. The spindle has a hollow tapered bore $4^a$ for receiving the usual cutter or cutter bar. The lower end of the bracket has a bore $3^a$ which is concentric with the spindle.

The cutter head guide or supporting member 11 of my device is supported by and at the inner side of the bracket 3, and has a boss $11^a$ which extends into and is rotatably mounted in the bore $3^a$ of the bracket.

At the outer side of the bracket 3 is a collar or cap 12 having a reduced locating portion $12^a$ which also fits into but from the outer end of the bore $3^a$. The cap is secured to the boss $11^a$ by means of a cap screw 13. The cap is non-rotatably connected to the boss $11^a$ of the cutter head guide or supporting member by means of a dowel pin 14.

The peripheral portion of the cap 12 is graduated, as indicated by $12^b$, to indicate the angular position of the guide 11 with respect to the bracket, the hub $3^b$ of the bracket having an index mark $3^c$ to facilitate the location of the guide at the desired angular position. The accuracy of the angular position of the guide depends upon the fixedness of the bracket 3. This bracket is non-rotatably secured to the arm 2. If two of such arms are provided, as in some milling machines, the bracket 3 is automatically prevented from rotating and needs no positive locating means.

The guide 11 is provided at its inner side with a dovetail channel $11^b$ in which is reciprocally mounted a correspondingly shaped portion $15^a$ of a cutter head 15, the reciprocation of the head being transverse to the rotating axis of the guide. At the inner side of the cutter head 15 is provided a slot $15^b$, which is positioned at right angles to both the direction of reciprocation of the head 15 and the rotating axis of the guide.

The means for reciprocating the cutter head 15 is shown in Figs. 1, 3, and 5, and consists primarily of a crank support 21 and a crank member 22. The crank support consists of a tapered shank $21^a$ which is adapted to fit into the tapered recess $4^a$ on the spindle 4. At the outer end of the tapered shank is provided a flange $21^b$ which may be a separate member, or integrally secured thereto as shown. The crank member 22 is a flat triangularly shaped member, and is pivotally mounted thereon near one of its apexes near the peripheral portion of the flange $21^b$. The pivotal connection of the crank member to the face of the flange $21^b$ is by means of a cap screw 23 inserted from the back side of the flange. The opposite apex portion of the crank member is adjustably secured to the face of the flange by means of a second cap screw 24, which extends through an arcuate slot 21ᶜ also from the back side of the flange. The center of the curvature of the slot 21ᶜ is the axis of the pivotal mounting of the crank member. Near the third apex of the crank member is a crank pin 22ᵃ, the axis of which is positioned at one side of the line connecting the pivotal axis of the screw 23 and the securing screw 24. Over the pivot pin 22ᵃ is a square bearing block 25 which fits into the slot 15ᵇ of the cutter head.

A variation of the stroke of reciprocation of the cutter head may be easily made by the unloosening of the cap screw 24 and shifting the same about the pivot screw 23, thereby shifting the pivot pin 22ᵃ with respect to the axis of revolution of the spindle.

The head 15 has bores 15ᶜ and 15ᵈ which extend parallel to the direction of reciprocation, but are located at the opposite sides of the axis of rotation of the guide. A cutter bar 31 is adapted to be positioned in either of these bores and may be secured therein by set screws 32. The purpose of positioning the cutter bar 31 at one side of the rotating axis of the guide is to locate the cutting means close to the work to be slotted or otherwise cut, and without interfering with the work-holding means on the carriage 5 when the cutter head is positioned to reciprocate in an angular direction, as indicated by dotted lines in Fig. 2.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In an attachment for milling machines having a projecting spindle, an overarm, and depending bracket means disposed outwardly beyond the end of the spindle, a guide adapted to be mounted adjacent the inner end of the bracket, a head slidably mounted on the guide, and a crank adapted to be carried by the spindle and connected to the head for reciprocating the head on the guide.

2. In an attachment for milling machines having a projecting spindle, an overarm, and depending bracket means disposed outwardly beyond the end of the spindle and having a bore concentric with the spindle, a guide having a boss adapted to be rotatably adjusted in the bore, means disposed against the outer side of the bracket means for adjustably securing the boss therein, a head slidably mounted on the guide, a crank adapted to be carried by the spindle and connected to the head for reciprocating the head on the guide.

3. In a milling machine having a projecting spindle, an overarm above the spindle, and depending bracket means at the end of the arm and disposed outwardly beyond the end of the spindle, said bracket having a guide, a head slidably mounted thereon, said head having a bore at one side of and transversely of its axis, a cutting-tool supporting bar adjustably secured in the bore, and a crank on the spindle and connected to the head for reciprocating the head on the guide.

4. In a milling machine having a projecting spindle, an overarm above the spindle, and depending bracket means at the end of the arm and disposed outwardly beyond the end of the spindle, said bracket having a guide rotatably adjustable coaxially with the spindle and disposed between said bracket means and said spindle, a head slidably mounted thereon transversely of its rotating axis, a crank carried by the spindle and connected to the head for reciprocating the head on the guide, said head having a bore transversely with respect to its rotating axis, and a cutting-tool supporting bar adjustably securable in said bore.

5. In a structure of the class described, a rotatable spindle having a supporting flange at one end, a plate-like crank member pivotally mounted at one end against the face of the flange and near the peripheral portion thereof, the flange having an arcuate slot near the peripheral portion at the opposite side of the rotating axis of the spindle, bolt means adjustably securing the opposite end of the crank member to the face of the flange through said slot, a crank pin extending outwardly from the crank member intermediate the pivotal axis thereof and the bolt means and at one side of the line connecting said pivotal axis and the bolt means.

6. In a milling machine having a projecting spindle, an overarm above the spindle, and depending bracket means at the end of the arm disposed outwardly beyond the end of the spindle and having a bore in axial alignment with said spindle, a guide disposed between said bracket means and the spindle and having a boss rotatably adjustable in the bore, clamping means disposed against the outer side of said bracket means and engageable with the boss for clamping said guide against said bracket means in different positions of angular adjustment, a head slidably mounted on the guide transversely of the axis of the boss, and a crank carried by the spindle and connected to the head for reciprocating the head on the guide.

7. In a milling machine having a projecting spindle, an overarm above the spindle, and depending bracket means at the end of the arm disposed outwardly beyond the end of the spindle and having a bore in axial alignment with said spindle, a guide disposed between said bracket means and the spindle and having a boss rotatably adjustable in the bore, a cap disposed against the outer side of the bracket member and provided with a reduced portion engaged in said bore to adapt the cap for rotatable adjustment on the bracket means, interengaging means on the boss and the cap for connecting the guide and cap for unitary angular adjustment in said bore, a clamping screw engageable with and adapted to draw said boss and said cap together to clamp the same in different positions of angular adjustment, a head slidably mounted on the guide transversely of the axis of the boss, and a crank carried by the spindle and connected to the head for reciprocating the head on the guide.

WILLARD C. HUNGERFORD.

REFERENCES CITED

The following references are of record in the file of this patent:

UNITED STATES PATENTS

| Number | Name | Date |
|---|---|---|
| 1,412,915 | Boker | Apr. 18, 1922 |
| 1,661,509 | Skinner | Mar. 6, 1928 |

FOREIGN PATENTS

| Number | Country | Date |
|---|---|---|
| 588,397 | France | Jan. 30, 1925 |